Nov. 12, 1968  R. ASHTON ET AL  3,410,389
GRAIN HANDLING APPARATUS
Filed March 20, 1967  3 Sheets-Sheet 1

INVENTORS.
ROBERT ASHTON
BY WILBERT D. WEBER
WALTER HIRSCH

Tweedale & Gerhardt
ATTORNEYS.

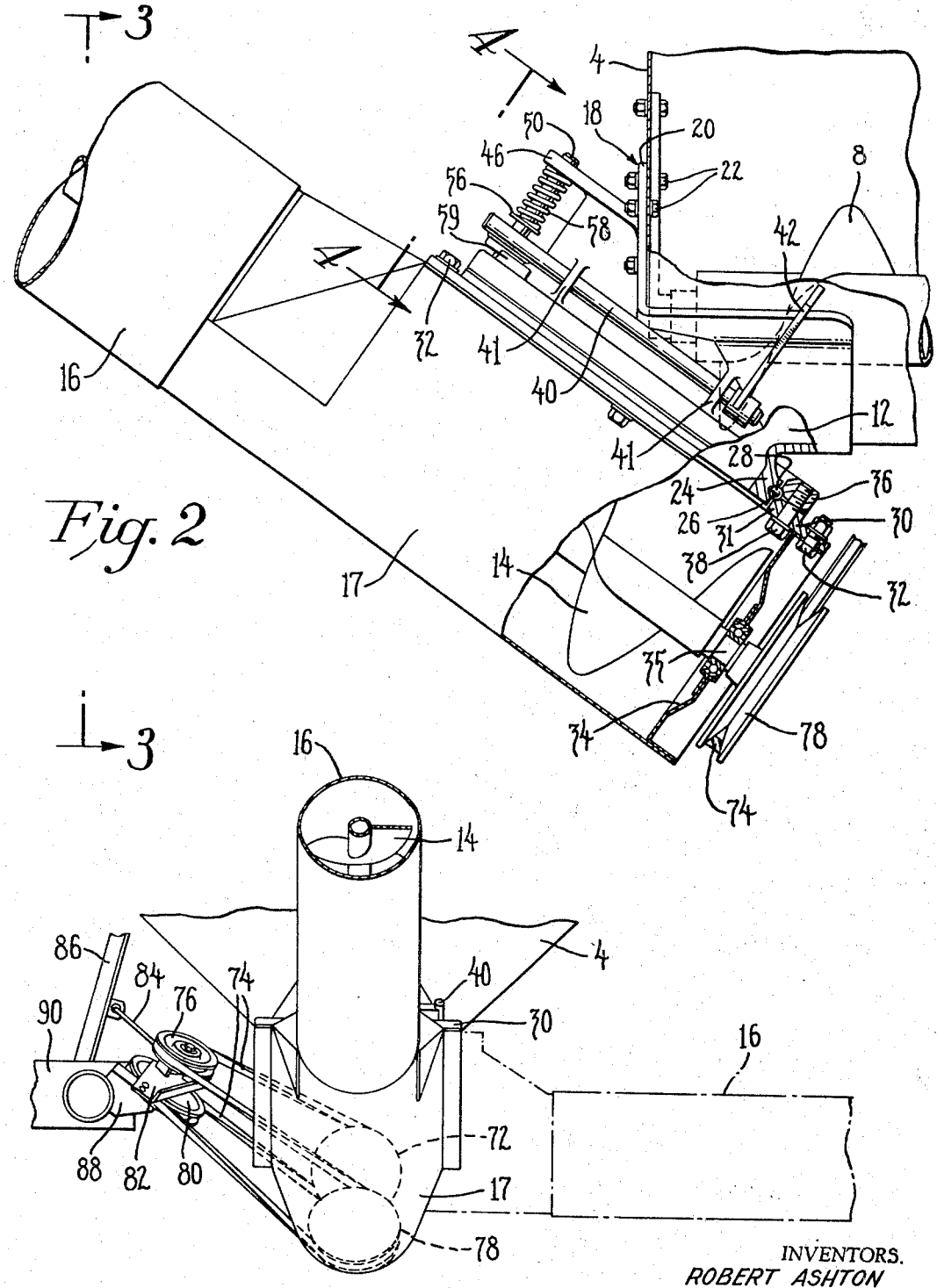

INVENTORS.
ROBERT ASHTON
WILBERT D. WEBER
WALTER HIRSCH
BY
Tweedale & Gerhardt
ATTORNEYS.

United States Patent Office 3,410,389
Patented Nov. 12, 1968

3,410,389
GRAIN HANDLING APPARATUS
Robert Ashton, Islington, Ontario, Wilbert D. Weber, Nashville, Ontario, and Walter Hirsch, Don Mills, Ontario, Canada, assignors to Massey-Ferguson Industries Limited, Toronto, Ontario, Canada
Filed Mar. 20, 1967, Ser. No. 624,558
5 Claims. (Cl. 198—114)

ABSTRACT OF THE DISCLOSURE

An unloading auger conveyor for a combine grain tank swivelly mounted on the tank permitting the auger to be moved to a storage or inoperative position lying closely alongside the tanks, and an unloading position projecting upwardly and outwardly from the tank to discharge the grain, and including a belt-drive arrangement for accommodating the swivel movement.

Summary of the invention

In accordance with the present invention, an unloading or discharge conveyor is mounted on a grain tank to receive the grain through the discharge opening in the tank. The unloading conveyor is mounted on the tank to rotate about an inclined axis between a storage or inoperative position in which it lies closely alongside the side wall of the tank or main body of the combine on which the tanks are carried, and an operative position in which it projects upwardly and outwardly from the side wall. The unloading conveyor carries a driven pulley connected through a belt with a drive pulley supported fixed relationship to the tank, the belt extending around a pair of offset idler pulleys arranged with respect to the drive and driven pulleys to accommodate the swinging movement of the driven pulley without disconnecting the drive.

Brief description of the drawings

FIG. 2 is an enlarged detail of the mounting assembly for the unloading conveyor; and FIGS. 3 and 4 are views taken along lines 3—3 and 4—4, respectively, of FIG. 2.

In FIG. 1, reference numeral 2 indicates a grain tank supported on the body B of a combine and including side or saddle tank portions 4 and 6. The saddle tank portions 4 and 6 extend down along opposite sides of the combine body B and are interconnected by the top center portion of the tank 2. Extending between the bottom of saddle tank portions 4 and 6 is a transfer conveyor 8 in the form of an auger enclosed in a tubular conduit 10 for moving grain from the bottom of the tanks to a discharge opening 12 (FIG. 2) in the bottom wall of tank 4. From the discharge opening 12, the grain is received by the inlet end of a discharge conveyor 14, enclosed within a tubular chute 16, for depositing the grain into a wagon or other suitable receptacle alongside the combine.

Figure 1:
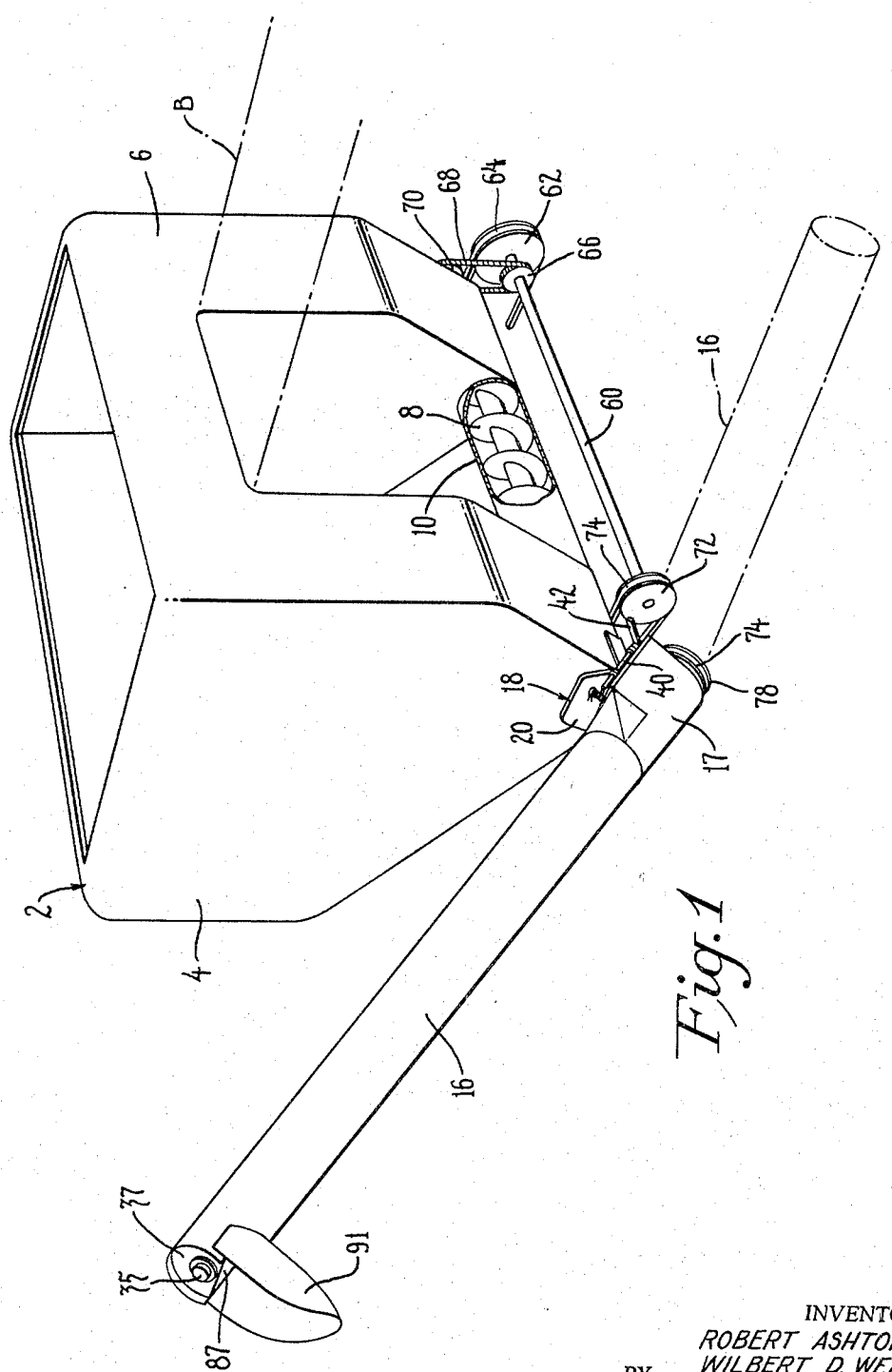
FIG. 1 is a perspective view of a combine grain tank having an unloading conveyor embodying the invention.

With reference primarily to FIG. 2, a mounting bracket 18 is secured to the side and bottom walls of saddle tank portion 4 by a side flange 20 and bolts 22. Bracket 18 includes a ring 24 surrounding the discharge opening 12 and having a groove formed on its outer periphery defining a ball bearing race. Balls 28 are received in the groove 26 and are secured thereto by a mounting plate 30 having an annular rim 31 secured to the inlet end of the discharge chute 16 by bolts 32 and a retaining ring 36 secured to mounting plate 30 by bolts 38. Auger 14 has a shaft 35 rotatably supported in bearings mounted in the end walls 34 (FIG. 2) and 37 (FIG. 1) of chute 16. Chute 16 and auger 14 are therefore freely rotatable relative to the ring portion 24 of bracket 12 between the full line position shown in FIG. 1 for unloading the grain tank, and the storage position alongside the main body of the combine in parallel relationship with the side walls of the tank as shown in phantom lines in FIG. 1.

Figure 4:
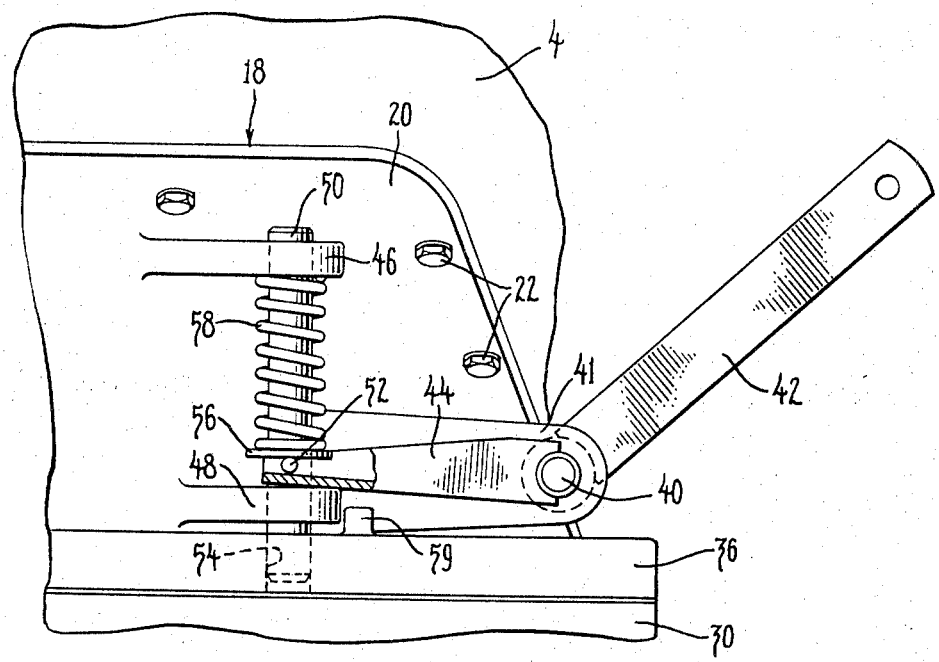

The shaft 40 of a locking lever 42 is supported in lugs 41 formed on bracket 18. Projecting from the end of shaft 40 opposite lever 42 is a latch actuating arm 44 for operating a locking pin 50 slideably mounted in upper and lower lugs 46 and 48 formed on flange 20 of bracket 18. A pin transverse 52 is mounted in locking pin 50 (FIG. 4) for supporting a spring seat washer 56, and a spring 58 is seated between lug 46 and washer 56 to urge locking pin 50 into engagement with a locking hole 54 formed in retaining ring 36. When pin 50 is received in hole 54, chute 16 is secured against rotation relative to bracket 18. Formed on retaining ring 36 is a stop member 59 engageable with the lower lug 48 to prevent over travel of chute 16 in a counter-clockwise direction from the position shown in FIG. 1.

The transfer auger and unloading augers are driven by a drive shaft 60 (FIG. 1) which in turn is driven through a pulley 62 by a belt 64 connected with a combine engine or other source of power. Rotation of shaft 60 is transmitted to the transfer auger 8 through a chain 68 mounted on sprockets 66 and 70 which in turn are mounted respectively on shaft 60 and the shaft of auger 8. Rotation of shaft 60 is transmitted to the unloading auger 14 through a belt-drive assembly including a drive pulley 72 on shaft 60 and a belt 74 which extends around an idler pulley 76 (FIG. 3), a driven pulley 78 mounted on the shaft of auger 14, and an idler pulley 80. Pulleys 76 and 80 are mounted on supports 82 and 88 which are secured to structural members 84, 86 and 90 of the combine.

When the grain tank 2 is filled, the unloading chute 16 is rotated from the phantom line storage position shown in FIG. 1 to the full line operative position until the locking plunger 50 engages hole 54 in retaining ring 36. Power is then transmitted to shaft 60 through belt 64 and the grain is removed from the tanks by augers 8 and 14. Grain is delivered by auger 8 through opening 12 into the enlarged end portion 17 of chute 16 which encloses the inlet end of auger 14. Auger 14 delivers the grain through an opening 87 (FIG. 1) and a spout 91 to a wagon or receptacle alongside the combine. When the tank 2 is empty, the power is shut off from shaft 60 and lever 42 is rotated in a clockwise direction as viewed in FIG. 4 to withdraw plunger 50 from hole 54 permitting the unloading chute and auger 14 to be returned to the storage position. Belt 74 goes slack when the unloading chute 16 is moved from the operative position but remains on the pulleys.

While a specific example has been illustrated and described, it should be understood that the invention is not limited to the exact construction shown but that various alternatives in the construction and arrangement of parts will be apparent to those skilled in the art without departing from the scope and spirit of the invention.

We claim:

1. Grain handling apparatus comprising a tank for temporarily storing harvested grain, a discharge opening in the bottom of said tank, a transfer conveyor in said tank for conveying grain to the discharge opening, a discharge conveyor mounted externally of said tank for unloading grain from the tank and depositing it into a suitable receptacle, means rotatably mounting the inlet end of the discharge conveyor onto the tank adjacent the discharge opening for movement between storage and unloading positions such that the discharge conveyor is inclined outwardly from the side wall of the tank in its unloading position and moves toward the tank into parallel relationship with the side wall of the tank in its storage position, said mounting means comprising a bracket mounted on the tank having an opening surrounded by an inclined ring and communicating with the discharge opening, a mounting plate on the discharge conveyor having an opening therein surrounded by a circular rim, said rim concentrically and rotatably receiving said ring, and means securing said rim against axial displacement relative to said ring such that the delivery end of the discharge conveyor moves upwardly and outwardly relative to the side wall of the tank as it rotates about the axis of said inclined ring from its storage position.

2. Grain handling apparatus as claimed in claim 1 wherein said discharge conveyor comprises a tubular chute having end walls and an auger rotatably mounted between the end walls.

3. Grain handling apparatus as claimed in claim 2 further including a drive pulley suported in fixed relationship relative to the grain tank, a driven pulley fixed to the shaft of said auger and lying in an inclined plane relative to the plane of the drive pulley, and a belt interconnecting said drive and driven pulleys for transmitting rotation from said drive to driven pulley.

4. Grain handling apparatus as claimed in claim 3 further including means supporting said belt between said drive and driven pulleys such that the belt remains in engagement with the drive and driven pulleys during movement of the driven pulley relative to the drive pulley as the discharge conveyor moves between its operative and storage positions.

5. Grain handling apparatus as claimed in claim 4 further including means on said bracket for selectively locking the discharge conveyor in its operative position.

References Cited
UNITED STATES PATENTS

| | | | |
|---|---|---|---|
| 2,360,069 | 10/1944 | Marvin | 198—98 X |
| 2,730,227 | 1/1956 | Chicane | 198—53 |
| 3,342,355 | 9/1967 | Lasiter | 198—119 |

EDWARD A. SROKA, *Primary Examiner.*